(12) United States Patent
Amersfoort (10) Patent No.: US 11,832,623 B2
(45) Date of Patent: *Dec. 5, 2023

(54) SEPARATING MACHINE WITH FEEDING WHEEL

(71) Applicant: Provisur Technologies, Inc., Chicago, IL (US)

(72) Inventor: André Amersfoort, Montfoort (NL)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/317,736

(22) Filed: May 11, 2021

(65) Prior Publication Data

US 2021/0259262 A1 Aug. 26, 2021

Related U.S. Application Data

(63) Continuation-in-part of application No. 17/090,398, filed on Nov. 5, 2020.

(Continued)

(51) Int. Cl.
*A22C 17/00* (2006.01)
*A22C 25/16* (2006.01)

(52) U.S. Cl.
CPC ............ *A22C 17/004* (2013.01); *A22C 25/16* (2013.01)

(58) Field of Classification Search
CPC ........ A22C 25/16; A22C 17/04; A22C 17/004

(Continued)

(56) References Cited

U.S. PATENT DOCUMENTS 3,396,768 A * 8/1968 Kurihara ............... A22C 17/04
100/153
3,508,646 A * 4/1970 Conrad ................. A22C 17/04
384/549

(Continued)

FOREIGN PATENT DOCUMENTS

AT 202034 T 6/2001
AU 3148700 A 7/2000

(Continued)

OTHER PUBLICATIONS

International Search Report issued in application No. PCT/US2020/059106 dated Mar. 9, 2021. (26 pages).

(Continued)

*Primary Examiner* — Richard T Price, Jr.
(74) *Attorney, Agent, or Firm* — KLINTWORTH & ROZENBLAT IP LLP (57) ABSTRACT

A separating machine separates a food source material into first and second food portions. A separating arrangement includes a roller assembly and a belt assembly including a belt to be driven by the roller assembly. The separating arrangement includes a drum assembly arranged proximate to the belt assembly to define a separation area. The separating arrangement includes an inlet assembly configured to receive the food source material and a feeding wheel assembly positioned proximate to or within the inlet assembly and configured to direct the food source material into the separation area. The belt assembly is arranged relative to the belt assembly such that the food source material is pressed by the belt against the outer surface of the drum and the first food portion is pressed through the holes while the second food portion remains outside of the drum interior, thereby separating the first and second food portions.

20 Claims, 11 Drawing Sheets

Related U.S. Application Data (60) Provisional application No. 62/933,325, filed on Nov. 8, 2019.

(58) Field of Classification Search
USPC .......................................................... 452/138
See application file for complete search history.

(56) References Cited

U.S. PATENT DOCUMENTS

| | | | |
|---|---|---|---|
| 3,707,228 A * | 12/1972 | Conrad | ................ A22C 17/04 |
| | | | 209/704 |
| 3,734,000 A * | 5/1973 | Ziener | .................... B30B 9/241 |
| | | | 100/153 |
| 3,829,931 A | 8/1974 | Suerbaum | |
| 3,897,341 A | 7/1975 | Ozawa | |
| 4,156,384 A | 5/1979 | Hinds, Jr. et al. | |
| 4,232,051 A | 11/1980 | Hinds, Jr. et al. | |
| 4,348,290 A | 9/1982 | Schipper | |
| 4,637,094 A | 1/1987 | Matsubayashi | |
| 4,710,271 A | 12/1987 | Miller | |
| 4,826,595 A | 5/1989 | Franke | |
| 4,877,487 A | 10/1989 | Miller | |
| 4,899,890 A | 2/1990 | Ewing et al. | |
| 4,927,528 A | 5/1990 | Doppstadt | |
| 4,963,259 A | 10/1990 | Barcomb et al. | |
| 5,085,140 A | 2/1992 | Kunig | |
| 5,205,777 A | 4/1993 | Hohenester | |
| 5,241,901 A | 9/1993 | Kunig | |
| 5,385,244 A | 1/1995 | Kunig et al. | |
| 5,507,689 A | 4/1996 | McFarland et al. | |
| 5,674,117 A | 10/1997 | Kunig et al. | |
| 5,823,866 A | 10/1998 | Kunig | |
| 5,873,775 A | 2/1999 | Landahi et al. | |
| 5,894,791 A | 4/1999 | Rose et al. | |
| 5,947,810 A | 9/1999 | Magnasco et al. | |
| 6,604,991 B1 | 8/2003 | Jurs et al. | |
| 6,843,714 B2 | 1/2005 | Jurs et al. | |
| RE40,085 E | 2/2008 | Jurs et al. | |
| RE41,409 E | 6/2010 | Jurs et al. | |
| 8,231,443 B1 * | 7/2012 | Tomcak | .................. A22C 17/04 |
| | | | 452/135 |
| 8,689,682 B2 | 4/2014 | Rose et al. | |
| 9,039,498 B2 | 5/2015 | Schwarz | |
| 9,089,876 B2 | 7/2015 | Hoppe | |
| 10,376,893 B2 | 8/2019 | Evers | |
| 2007/0217898 A1 | 9/2007 | Goodrich | |
| 2010/0084319 A1 | 4/2010 | Hahn et al. | |
| 2011/0183591 A1 * | 7/2011 | Hazenbroek | ......... A22C 17/004 |
| | | | 452/136 |
| 2013/0129887 A1 | 5/2013 | Hoppe | |
| 2014/0061008 A1 | 3/2014 | Haythornthwaite | |
| 2018/0027848 A1 | 2/2018 | Blaine et al. | |
| 2018/0029246 A1 | 2/2018 | Blaine et al. | |
| 2021/0037837 A1 | 2/2021 | Günther | |

FOREIGN PATENT DOCUMENTS

| | | |
|---|---|---|
| BR | 112015001455 A2 | 7/2017 |
| BR | PI0808910 B1 | 6/2018 |
| BY | 22029 C1 | 6/2018 |
| CA | 2131403 C | 3/1995 |
| CA | 2338947 C | 2/2000 |
| CA | 2853882 C | 5/2013 |
| CA | 3032041 A1 | 2/2018 |
| CA | 3032196 A1 | 2/2018 |
| CL | 2014001277 A1 | 10/2014 |
| CN | 101462373 B | 6/2009 |
| CN | 101617852 A | 1/2010 |
| CN | 102740715 B | 10/2012 |
| CN | 102986818 A | 10/2014 |
| CN | 104487235 B | 4/2015 |
| CN | 109661176 A | 4/2019 |
| CN | 109788766 A | 5/2019 |
| CN | 208976319 U | 6/2019 |
| DE | 2408321 A1 | 9/1975 |
| DE | 59408066 | 9/1975 |
| DE | 59607081 | 9/1975 |
| DE | 59610024 | 9/1975 |
| DE | 19637640 C2 | 3/1998 |
| DE | 19756797 A1 | 6/1999 |
| DE | 19909608 A1 | 1/2000 |
| DE | 19834524 A1 | 2/2000 |
| DE | 19857138 A1 | 7/2000 |
| DE | 202004014365 U1 | 11/2004 |
| DE | 202005012430 U1 | 11/2005 |
| DE | 19981456 B4 | 6/2006 |
| DE | 202007004473 U1 | 6/2007 |
| DE | 102007063465 A1 | 6/2009 |
| DE | 202010001849 U1 | 5/2010 |
| DE | 112011100359 A5 | 11/2012 |
| DE | 102012106708 A9 | 10/2014 |
| DE | 102013014418 A1 | 3/2015 |
| DE | 102016108200 B3 | 12/2016 |
| DE | 102018101985 B3 | 9/2018 |
| DE | 102018102672 B9 | 7/2019 |
| DE | 102018112040 A1 | 11/2019 |
| DE | 102018112902 A1 | 12/2019 |
| DK | 0774208 T3 | 4/2003 |
| DK | 176472 B1 | 4/2008 |
| DK | 2129229 T5 | 7/2013 |
| DK | 178017 B1 | 3/2015 |
| DK | 178579 B1 | 7/2016 |
| EP | 43599 A1 | 1/1982 |
| EP | 0375877 A2 | 3/1992 |
| EP | 0796561 A1 | 9/1997 |
| EP | 0642738 B1 | 4/1999 |
| EP | 0966202 A1 | 12/1999 |
| EP | 0781645 B1 | 6/2001 |
| EP | 0774208 B1 | 1/2003 |
| EP | 2555980 A1 | 2/2013 |
| EP | 2129229 B1 | 5/2013 |
| EP | 2877341 A1 | 6/2015 |
| EP | 2591681 B1 | 1/2017 |
| EP | 3225559 A1 | 10/2017 |
| EP | 3275313 A1 | 1/2018 |
| EP | 3490383 A1 | 6/2019 |
| EP | 3524420 A1 | 8/2019 |
| EP | 3569397 A1 | 11/2019 |
| ES | 2131606 T3 | 8/1999 |
| ES | 2160201 T3 | 11/2001 |
| ES | 2189849 T3 | 7/2003 |
| GB | 201190 A | 7/1923 |
| GB | 751757 A | 7/1956 |
| GB | 1571238 A | 7/1980 |
| GB | 2093331 A | 9/1982 |
| GB | 2455643 B | 6/2009 |
| IL | 119906 A | 11/1999 |
| IS | 2433 B | 10/2008 |
| JP | 5688094 B2 | 10/1978 |
| JP | 2000006092 A | 1/2000 |
| JP | 3090375 B2 | 9/2000 |
| JP | 2002028894 A | 1/2002 |
| JP | 2002036176 A | 2/2002 |
| JP | 2002059394 A | 2/2002 |
| JP | 2002515752 A | 5/2002 |
| JP | 2002337092 A | 11/2002 |
| JP | 4366214 B2 | 11/2009 |
| JP | 4685395 B2 | 5/2011 |
| JP | 5819101 B2 | 11/2015 |
| JP | 6100474 B2 | 3/2017 |
| JP | 2019526061 A | 9/2019 |
| JP | 2019527369 A | 9/2019 |
| KR | 2019039527 A | 4/2019 |
| KR | 2019040199 A | 4/2019 |
| NL | 1008515 C2 | 9/1999 |
| NL | 1037871 C2 | 10/2011 |
| NO | 323027 B1 | 12/2006 |
| PL | 2591681 T3 | 6/2017 |
| RU | 2606101 C2 | 1/2017 |
| SE | 511326 C2 | 9/1999 |
| UA | 111902 C2 | 6/2016 |
| WO | 1999033349 A1 | 7/1999 |
| WO | 2000007452 A1 | 2/2000 |

(56) References Cited

FOREIGN PATENT DOCUMENTS

| WO | 2000035292 A1 | 6/2000 |
| WO | 2008116650 A1 | 10/2008 |
| WO | 2011092087 A1 | 8/2011 |
| WO | 2011136643 A1 | 11/2011 |
| WO | 2013072247 A1 | 5/2013 |
| WO | 2014016210 A1 | 1/2014 |
| WO | 2018019817 A1 | 2/2018 |
| WO | 2018022598 A1 | 2/2018 |
| WO | 2020127086 A1 | 6/2020 |

OTHER PUBLICATIONS

International Search Report issued in application No. PCT/US2021/034092 dated Sep. 14, 2021. (13 pages).
Normar Trading As. YouTube Sepamatic 4000 Bone Separator for Meat and Fish dated Jan. 30, 2020 (entire video) URL: https://www.youtube.com/watch?v=GNJIUNT3dR8> (3 pages).
Extended European Search Report issued in counterpart European Application No. 20883934.0-1105 / 4017268 PCTUS2020059106 dated Jul. 13, 2023.

\* cited by examiner

SEPARATING MACHINE WITH FEEDING WHEEL

CROSS-REFERENCE TO RELATED APPLICATION

This application is a continuation-in-part application of U.S. application Ser. No. 17/090,398 ("the '398 Application"), filed Nov. 5, 2020. The '398 application is a non-provisional application of, and claims priority to U.S. Provisional Patent Application 62/933,325 ("the '325 Application"), filed Nov. 8, 2019. The '398 application and '325 application are incorporated herein by reference.

FIELD OF THE DISCLOSURE

This disclosure relates to food separating machines and separating methods.

BACKGROUND

A separating machine functions to separate a source material into portions with a first consistency and a second consistency (e.g., a hard consistency and a soft consistency). Such machines may be useful in the food industry for separating a desired portion (e.g., a food product) of a source food product from an undesired portion (e.g., a waste product). Examples of such food products include beef or other meat products to remove gristle and/or bone, and fish to separate or remove skin and/or fish bones.

SUMMARY OF THE DISCLOSURE

In one example, a separating machine is provided to separate a food source material into a first food portion and a second food portion. The separating machine includes a frame and a separating arrangement supported by the frame. The separating arrangement includes a roller assembly and a belt assembly including a belt extending about and configured to be driven by the roller assembly. The belt has an inner surface contacting the roller assembly and an outer surface opposite the inner surface. The separating arrangement further includes a drum assembly with a drum that defines a drum interior, an inner surface facing the drum interior, an outer surface opposite the inner surface, and a plurality of holes extending between the inner and outer surfaces of the drum. The drum assembly is arranged proximate to the belt assembly to define a separation area for the food source material in between. The separating arrangement further includes an inlet assembly configured to receive the food source material and a feeding wheel assembly positioned proximate to or within the inlet assembly and configured to direct at least a portion of the food source material from the inlet assembly into the separation area. The belt assembly is arranged relative to the belt assembly such that the food source material delivered by the inlet assembly or the feeding wheel assembly into the separation area is pressed by the belt against the outer surface of the drum and the first food portion is pressed through the holes into the drum interior while the second food portion remains outside of the drum interior, thereby separating the first and second food portions.

In a further example, a method is provided for separating a food source material into a first food portion and a second food portion. The method includes receiving the food source material in an inlet assembly; directing, with a feeding wheel assembly, at least a portion the food source material received by the inlet assembly into a separation area in between a belt of a belt assembly extending about a roller assembly and a drum assembly with a drum having a plurality of holes extending between inner and outer surfaces of the drum; and pressing, with the belt, the food source material against the outer surface of the drum such that the first food portion passes through the plurality of holes and the second food portion remains outside of a drum interior, thereby separating the first and second food portions.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

An example separating machine 100 is depicted in FIGS. 1-15 discussed in greater detail below. With initial reference to FIGS. 1 and 2, the separating machine 100 generally functions to separate a food source material into portions with a first food portion with a first consistency and a second food portion with a second consistency (e.g., a hard consistency and a soft consistency). As examples, from the food source material, the separating machine 100 may separate a food product with a relatively soft consistency, such as a meat, sausage, fish or cheese item, from a waste product with a relatively hard consistency, such as gristle, bone, fish bones, fish skin, or packaging materials that enclose the respective food products.

Additionally referring to the views of FIGS. 3-8, 10, and 11, the separating machine 100 includes a separating arrangement 130 generally arranged within a primary housing portion 120 of a machine housing 110. Broadly, the separating arrangement 130 may be considered to include an inlet assembly 140, a drum assembly 150, a roller assembly 170, a belt assembly 230, and a feeding wheel assembly 320. As also discussed in greater detail below, the separating machine 100 may further include one or more of a tensioning device 280 and a knife assembly 300 that facilitate operation of the separating machine 100 by improving the ability to separate the portions of the food source material. In one example, the tensioning device 280 and the knife assembly 300 may be operated by mechanical or manual adjustment or by fluid pressure, and as used herein, the terms "pneumatic" and "hydraulic" may be used interchangeably in which gas and/or liquid is used as a working fluid.

Figures 1, 2:
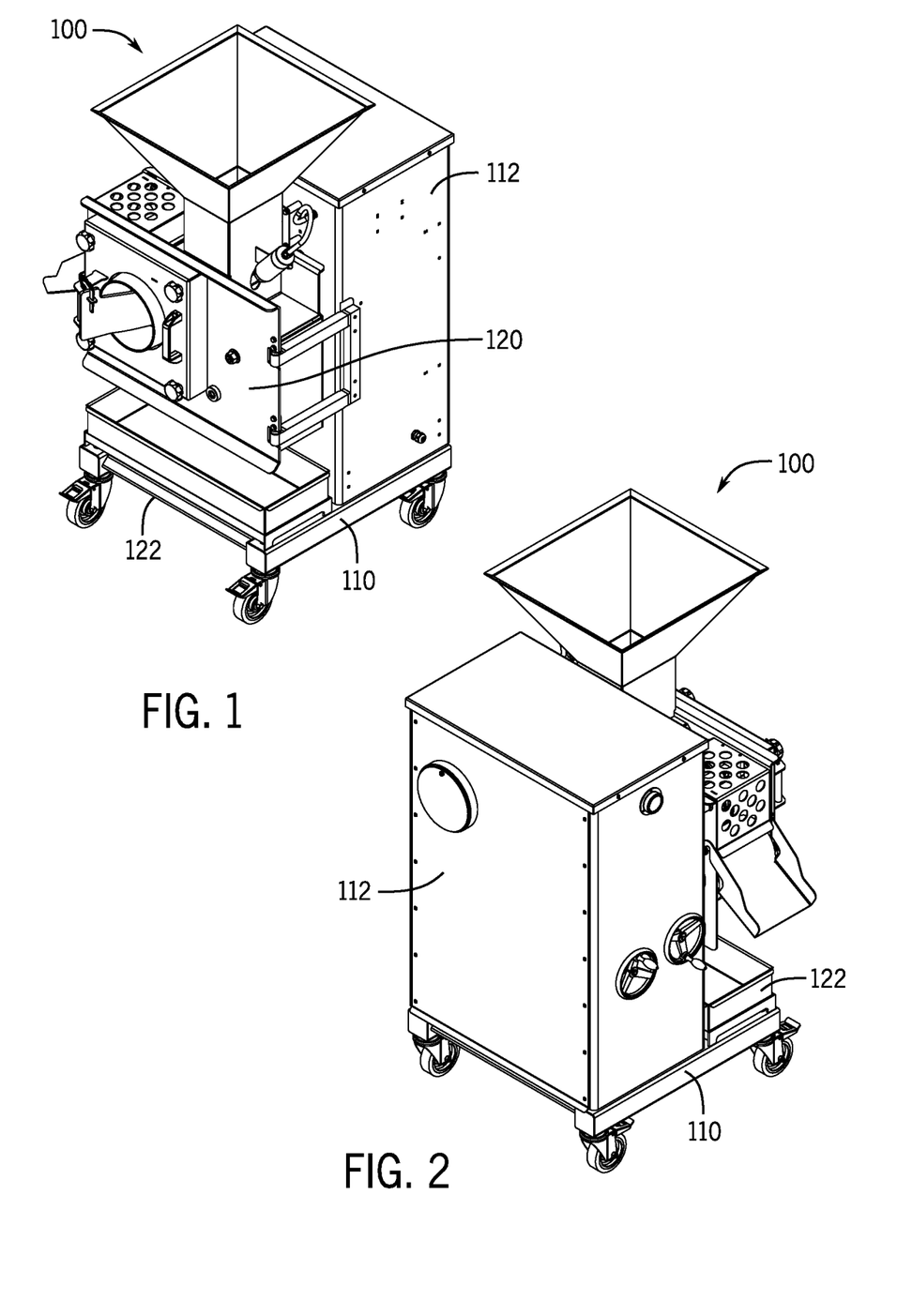
FIG. 1 is a top, front isometric view of a separating machine according to an example embodiment.
FIG. 2 is a top, rear isometric view of the separating machine of FIG. 1 according to an example embodiment.
Figure 3:
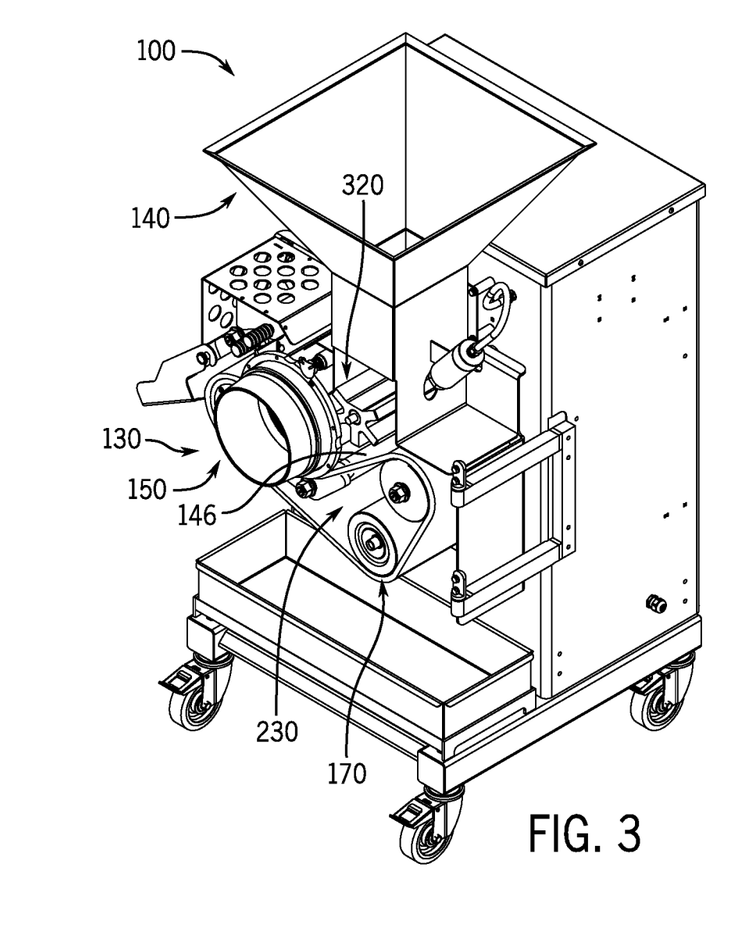
FIG. 3 is a top, front isometric view of the separating machine of FIG. 1 with a housing portion removed according to an example embodiment.
Figure 4:
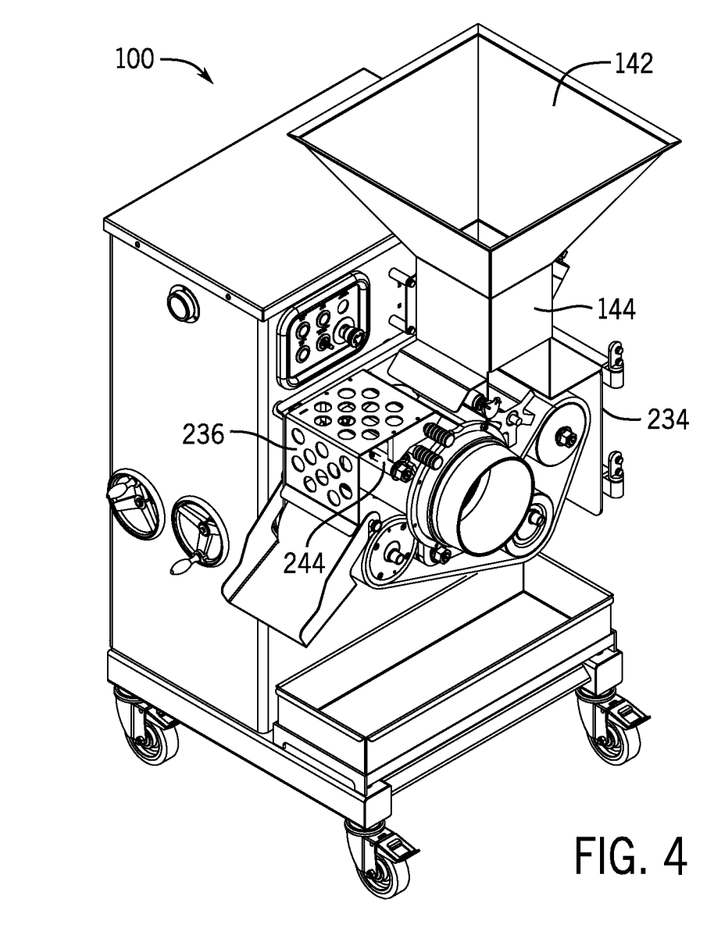
FIG. 4 is a further front isometric view of the separating machine of FIG. 1 with a housing portion removed according to an example embodiment.

In one example and best shown in FIGS. 1 and 2, the separating machine 100 includes the frame or housing 110 with one or more walls 112 supported by various vertical members, lateral members, and cross members. The frame 110 may be considered to include the primary portion or housing portion 120 that houses most of the components of the separating machine 100 and a shelf portion 122 arranged vertically underneath the primary housing portion 120. The views of FIGS. 1 and 2 particularly depict the frame walls 112 that enclose the interior components of the separating machine 100. The walls 112 may include one or more doors or access panels to allow access to the internal components of the separating machine 100.

Reference is further made to FIG. 3-6, which depict front isometric views of the separating machine 100 with the walls 112 removed for clarity. In one example, the separating machine 100 includes a separating arrangement 130 generally arranged within the primary housing portion 120. As noted, the separating arrangement 130 may be considered to include an inlet assembly 140, a drum assembly 150, a roller assembly 170, a belt assembly 230, and a feeding wheel assembly 320.

The inlet assembly 140 includes an inlet funnel 142 and an inlet passage 144 coupled to the inlet funnel 142. The inlet funnel 142 generally has internally tapered walls to receive the food source material in any suitable manner, including by an operator or a loading assembly. The inlet passage 144 receives the food source material from the inlet funnel 142 and guides the food source product into a separation area 146, as described in greater detail below.

In one example, the drum assembly 150 includes a drum 152 with an outer surface 154 and an inner surface 156. The inner surface 156 defines a drum interior. As described in greater detail below, the drum 152 includes one or more rows or arrangements of holes 158 extending around the circumference and through the drum 152, e.g., from the outer surface 154 to the inner surface 156. The holes 158 may be obscured in FIG. 3; and as such, brief reference is made to FIG. 9, which depicts a portion of the outer surface 154 of the drum 152 with an array of holes 158. The holes 158 within the drum 152, through which the food product portions of soft consistency are passed, may have a width in the range of 0.1-30 mm, including approximately 1-20 mm. The holes 158 may be round, have a curved shaped rim, and/or have a different shape.

Figure 7:
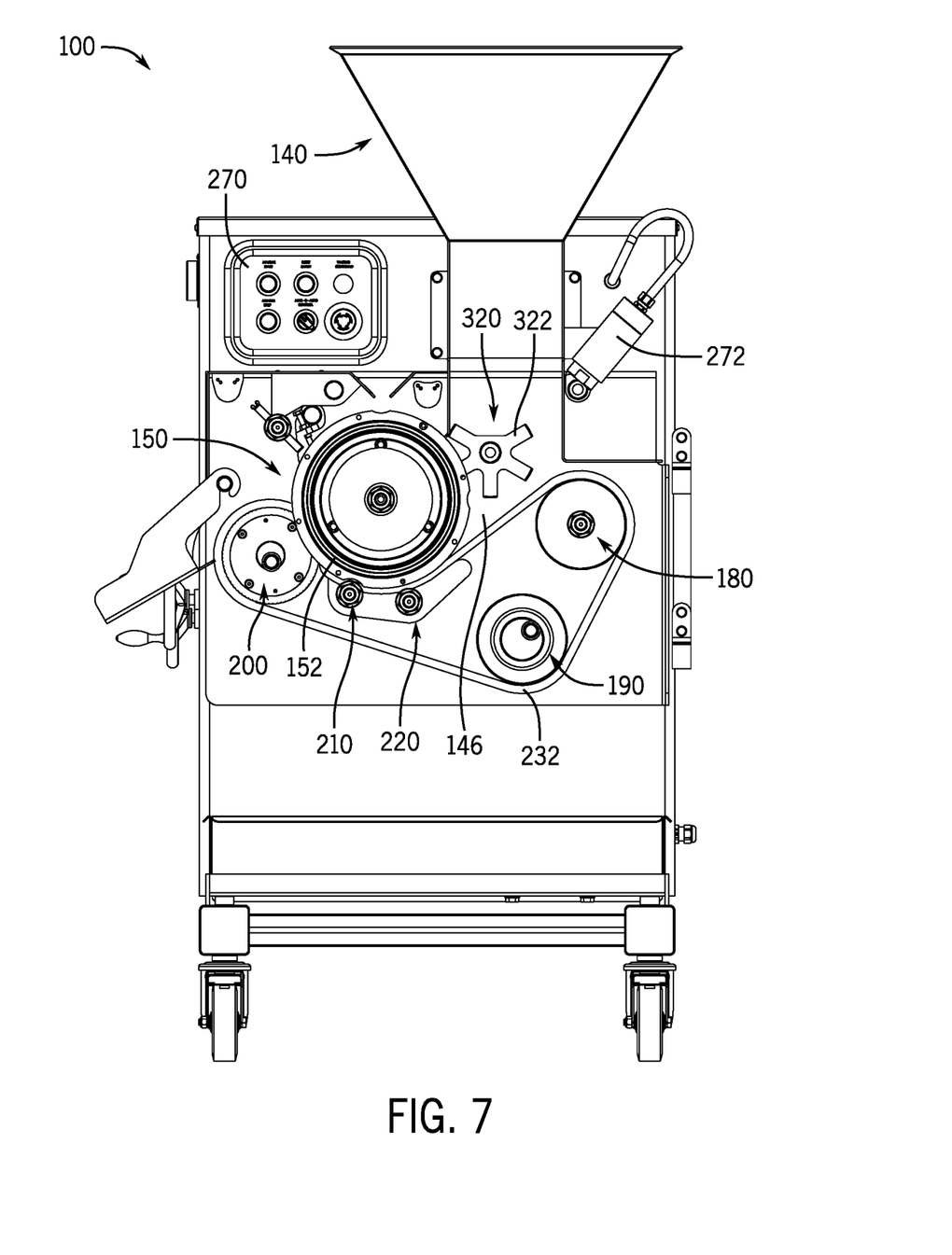
FIG. 7 is a front plan view of the separating machine of FIG. 1 with a housing portion removed according to an example embodiment.
Figure 8:
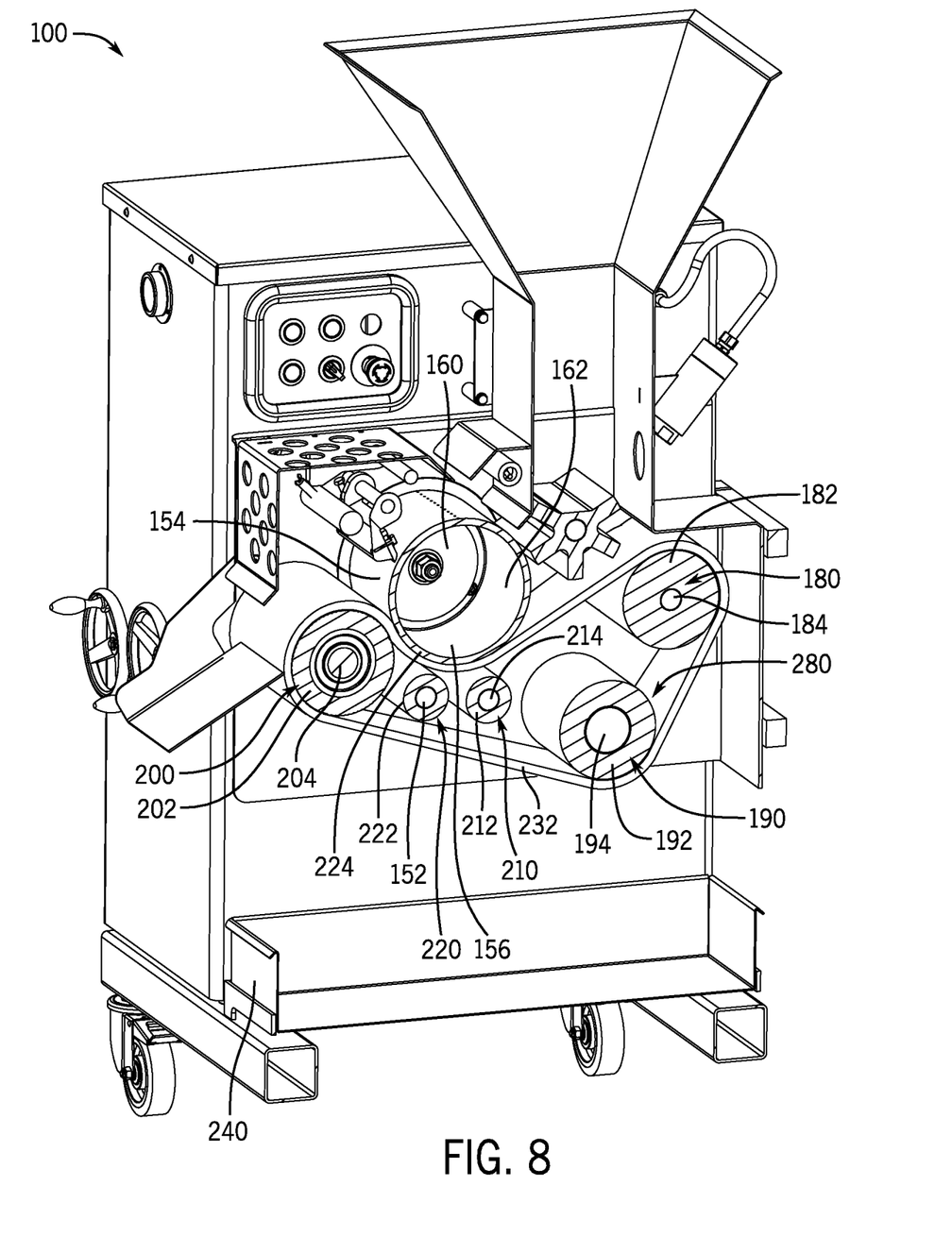
FIG. 8 is a sectional front isometric view of the separating machine of FIG. 1 according to an example embodiment.
Figure 9:
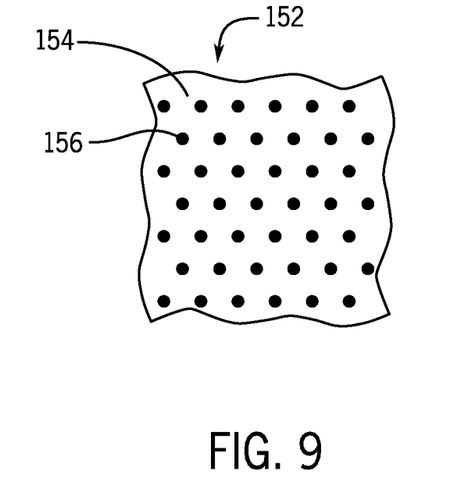
FIG. 9 is a closer sectional front isometric view of the separating machine of FIG. 1 according to an example embodiment.
Figure 10:
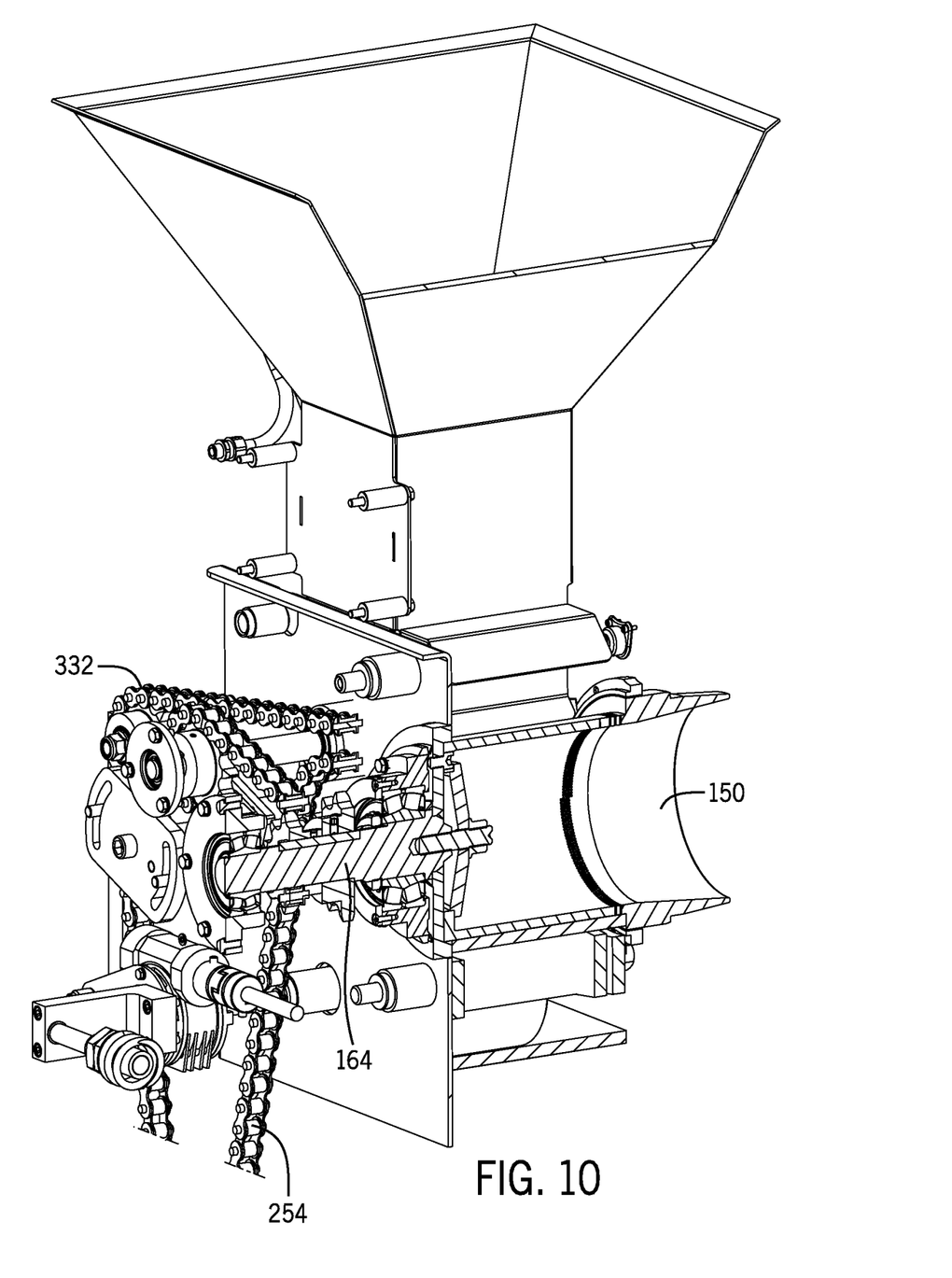
FIG. 10 is a sectional side isometric view of the separating machine of FIG. 1 according to an example embodiment.
Figure 11:
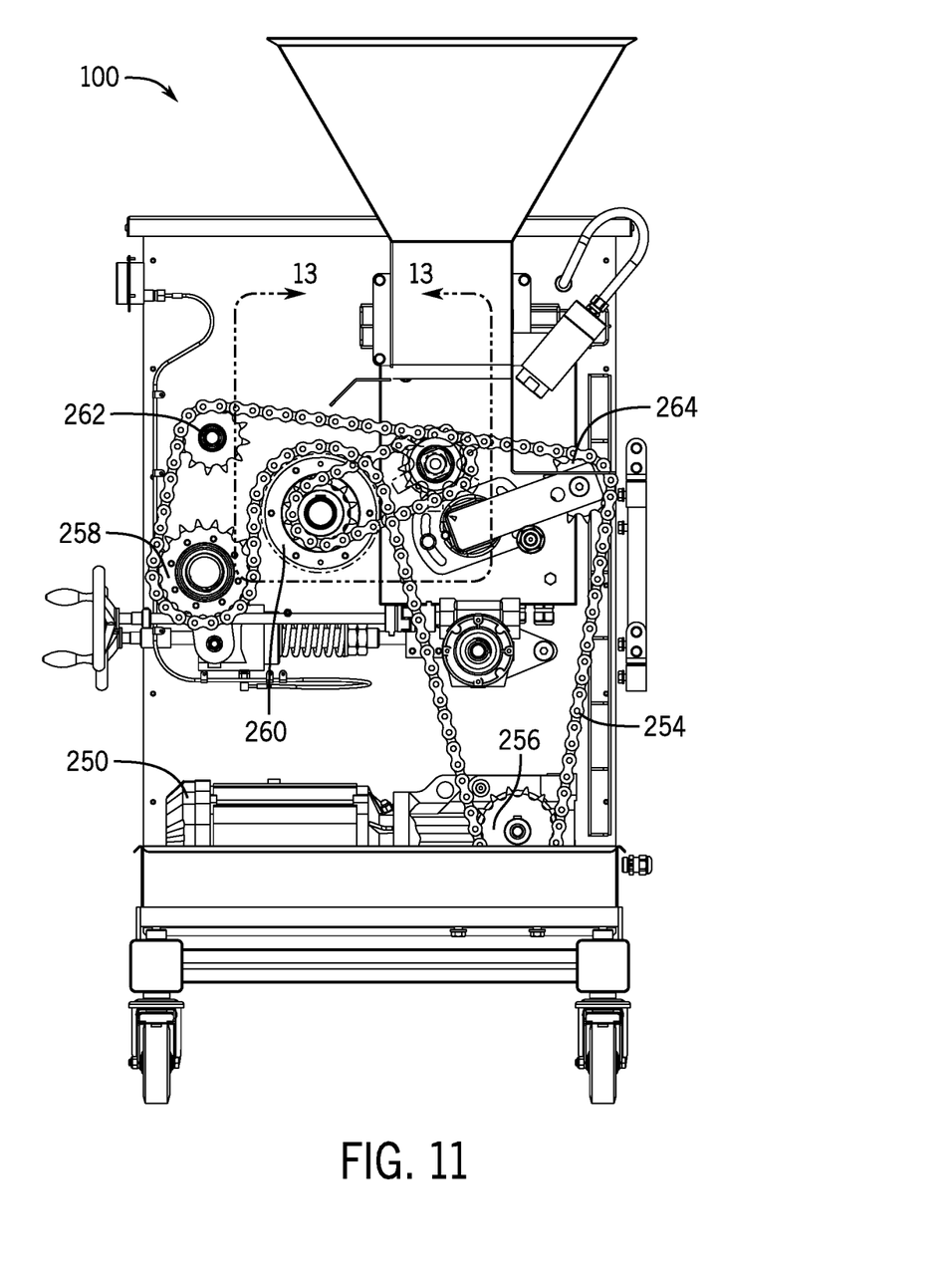
FIG. 11 is a front sectional view of the separating machine of FIG. 1 with a housing portion removed according to an example embodiment.
Figure 12:
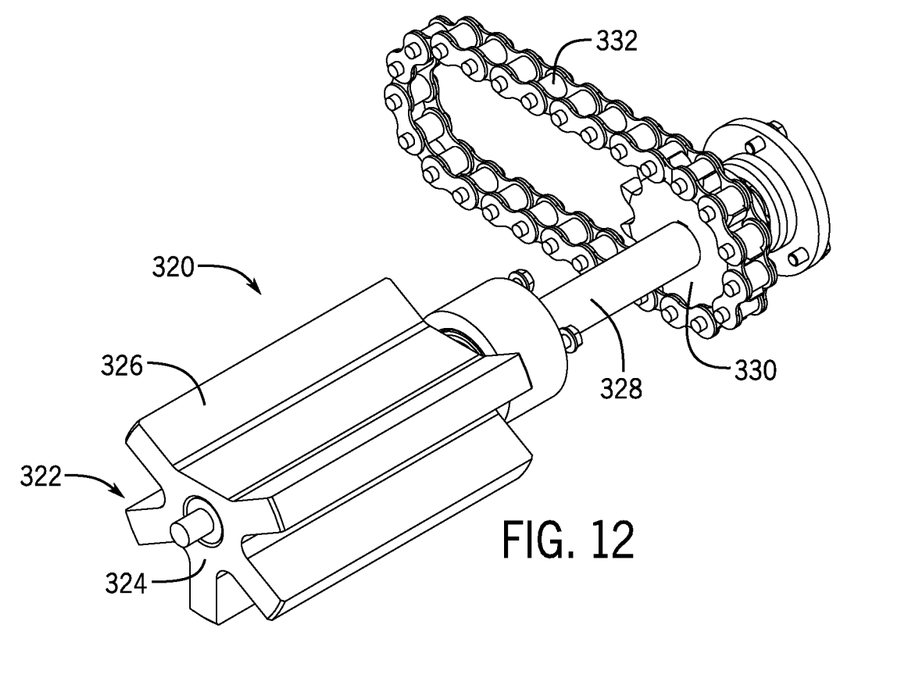
FIG. 12 is an isometric view of a feeding wheel assembly of the separating machine of FIG. 1 according to an example embodiment.
Figure 13:
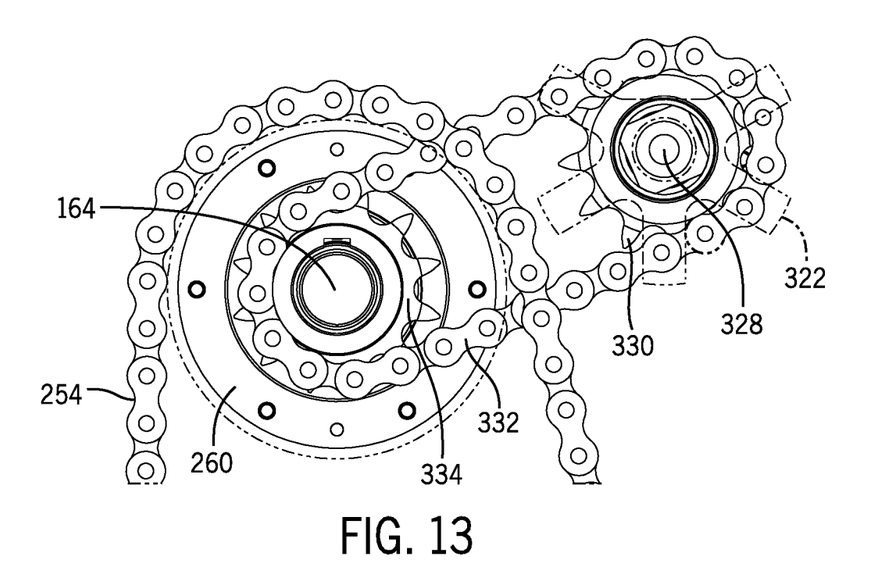
FIG. 13 is a side view of a drive mechanism of the feeding wheel assembly of FIG. 12 according to an example embodiment.

Additionally referring to FIGS. 7, 8, and 10, the drum 152 may have a closed end 160 and an open end 162 with the closed end 160 oriented toward the interior of the separating machine 100 and the open end 162 oriented away from the interior of the separating machine 100. As best shown in the view of FIG. 1, the open end 162 of the drum 152 may extend beyond or proximate to an outer front wall 112 of the separating machine 100. The drum 152 may be supported for rotation by a generally horizontal shaft 164 about a generally horizontal axis. As described in greater detail below, the drum assembly 150 may include one or more drive elements for facilitating rotation. The drum assembly 150 may further include a drum cone arranged within the drum interior for rotation with the drum 152.

In this example, the roller assembly 170 may include a number of roller devices 180, 190, 200, 210, 220 that generally operate to support the belt assembly 230, as discussed in greater detail below.

As best shown by FIG. 8, generally, each roller device 180, 190, 200, 210, 220 includes a roller 182, 192, 202, 212, 222 supported by a roller shaft 184, 194, 204, 214, 224 for rotation about a respective generally horizontal axis. Each roller 182, 192, 202, 212, 222 is positioned on a first end of the respective roller shaft 184, 194, 204, 214, 224, and a drive element may be positioned on the other end of one or more of the roller shafts 184, 194, 204, 214, 224, as discussed in greater detail below. As a result, the roller devices 180, 190, 200, 210, 220 are configured to be driven, or otherwise rotate, to drive or otherwise support the belt assembly 230. Additional details regarding operation of the roller assembly 170 are provided below.

The belt assembly 230 is generally formed by an endless belt 232 that is wrapped around the rollers 182, 192, 202, 212, 222 of the roller devices 180, 190, 200, 210, 220. During operation, one or more of the rollers 182, 192, 202, 212, 222 operate to drive or otherwise rotate with the belt 232. The endless belt 232 may be formed by a deformable material, such as an elastically deformable material, including a composite material that may have layers of differing strength, for example tensile and/or tearing strength. In one example, the surface or the layers near the surface of the belt 232 may be a plastic material, for example a polyurethane material or a natural or synthetic rubber. The underside or inner surface of the belt 232 may be a continuous surface, through which no product of soft consistency may penetrate during the separating process. The belt 232 may have an intermediate layer that affords tensile strength in the longitudinal direction thereof, such as the form of cables of metal or other tensile-strength materials, including plastic material, a textile material, a fabric layer, e.g., including a textile material, for example a metallic material or plastic or the like. Additional layers, such as a wear layer, may be provided.

Accordingly, the roller assembly 170 cooperates with the belt assembly 230 to drive the endless belt 232 and to transport the food source material through the separation area 146 to be separated into food product and waste product, as described in greater detail below. The arrangement of the belt 232 around the roller devices 180, 190, 200, 210, 220 may vary.

As noted above, the feeding wheel assembly 320 facilitates operation of the machine 100. Generally, the feeding wheel assembly 320 is arranged proximate to or within the separation area, e.g., approximately in between the inlet assembly 140 and the drum assembly 150 and/or in between the inlet assembly 140 and the belt assembly 230. Briefly referring to FIG. 12, the feeding wheel assembly 320 includes a feeding wheel implement 322 formed by a core portion 324 and flanges 326, a feeding wheel shaft 328, a feeding wheel drive element 330, and a feeding wheel drive mechanism or chain 332. Additional details about the feeding wheel assembly 320 are discussed below.

The roller assembly 170 and belt assembly 230 may be supported by, enclosed by, and/or cooperate with one or more support elements, including panels 234 and/or scrapers 236 surrounding portions of the belt assembly 230. One or more auxiliary rollers 244 may also be provided in a position proximate to the drum 152. In one example, various support structures in the form of plates, flanges, bearings, and the like may be provided to support the positioning of the roller devices 180, 190, 200, 210, 220.

In the example best depicted in FIGS. 7 and 8, the first roller device 180 is arranged on a right side of the drum 152 in a position such that the horizontal axis of the first roller device 180 is arranged slightly vertically below the horizontal axis of the drum 152, although other arrangements may be provided. The second roller device 190 is also arranged on the right side of the drum 152 in a position such that the horizontal axis of the second roller device 190 is arranged vertically below the horizontal axis of the drum 152. In this example, the horizontal axis of the first roller device 180 and the horizontal axis of the second roller device 190 are vertically offset, although other arrangements may be provided. As described in the greater detail below, the second roller device 190 may be considered to be associated with a tensioning device 280 for applying a tension force to the belt 232, discussed below.

As also best shown in FIGS. 7 and 8, the third roller device 200 may be arranged on a left side (as viewed in FIGS. 7 and 8) of the drum 152 in a position such that the horizontal axis of the first roller device 180 is arranged vertically below the horizontal axis of the drum 152. In this example, the horizontal axis of the third roller device 200 is vertically in between the horizontal axis of the first roller device 180 and the horizontal axis of the second roller device 190. As described in greater detail below, in one example, the third roller device 200 may be used to drive the belt 232.

The fourth and fifth roller devices 210, 220 may be arranged just underneath the drum 152. The fifth roller device 220 is positioned approximately directly vertically underneath the drum 152, and the fourth roller device 210 is positioned to the right (as viewed in FIGS. 7 and 8) of the drum 152 and slightly above the fifth roller device 220. As described in greater detail below, the fourth and fifth roller devices 210, 220 cooperate to support the separation area 146 between the belt 232 and the drum 152, e.g., as a pressing apparatus to press the food source material on the belt 232 against the drum 152. As discussed in greater detail below, the feeding wheel assembly 320 may further operate to press the food source material against the drum 152. As a result of the arrangement of the roller assembly 170 and the belt assembly 230, the belt 232 is driven about the roller devices 180, 190, 200, 210, 220 to push the food source material against and at least partially into and through the drum 152 to separate the waste product.

As best shown in FIG. 8, one or more bins 240 may be arranged within the shelf portion 122 of the frame 110. In one example, the bins 240 may be positioned to collect food and/or waste products.

Accordingly, operation of the separating machine 100 will now be described. As noted above, food source material is deposited into the inlet assembly 140, particularly into the inlet funnel 142; and the food source material falls vertically through the inlet funnel 142 and the inlet passage 144 into the separation area 146 formed in between the belt 232 and the drum 152. Additionally, the feeding wheel assembly 320 is arranged within or proximate to the inlet passage 144 and is driven to facilitate the processing of the food source material. For example, the feeding wheel assembly 320 may operate to scoop or otherwise urge the food source material onto the belt 232 for conveyance to and against the drum 152, and/or the feeding wheel assembly 320 may be driven to press the food source material against the drum 152. As shown, the feeding wheel assembly 320 is positioned immediately adjacent to the drum 152 and the belt 232. Moreover, the feeding wheel assembly 320 is positioned off-center relative to an axis of the inlet assembly 140 (closer to one side of the inlet assembly 140), e.g., towards the drum 152.

In one example, the belt 232 is driven by the roller assembly 170 in a first direction (e.g., the counter-clockwise direction in the view of FIG. 5) to transport the food source material initially deposited from the inlet assembly 140 in the separation area 146 toward the drum 152. The separation area 146 is arranged in the gap between the belt 232 and drum 152. In one example, the drum 152 is driven in a second direction (e.g., the clockwise direction in the view of FIG. 5). As a result, the belt 232 and the drum 152 are being driven in the effectively same lateral direction within the separation area 146. The configuration may be modified such that the belt 232 and/or the drum 152 may be driven in the other direction.

Figure 5:
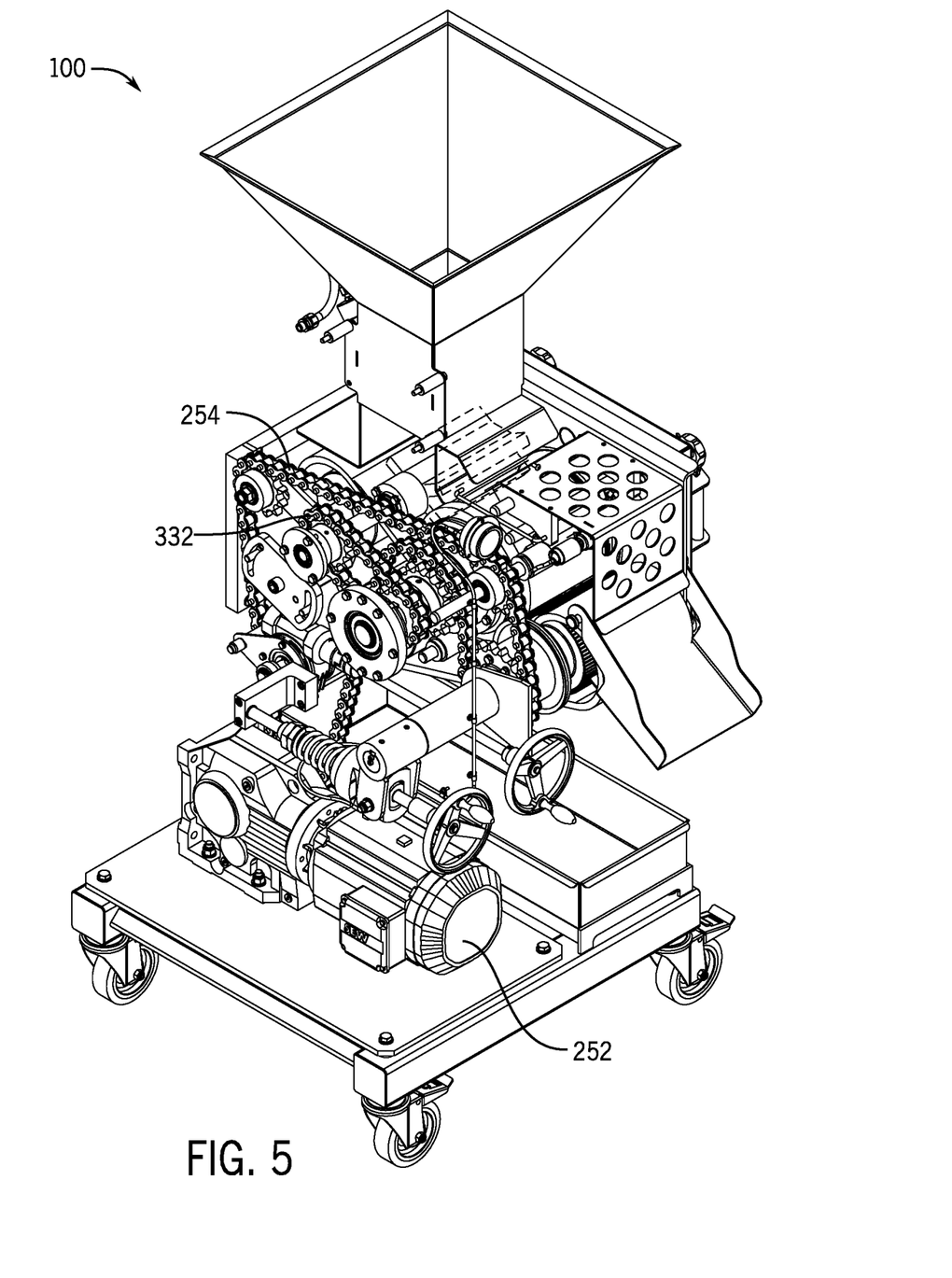
FIG. 5 is a top, rear isometric view of the separating machine of FIG. 1 with a housing portion removed according to an example embodiment.
Figure 6:
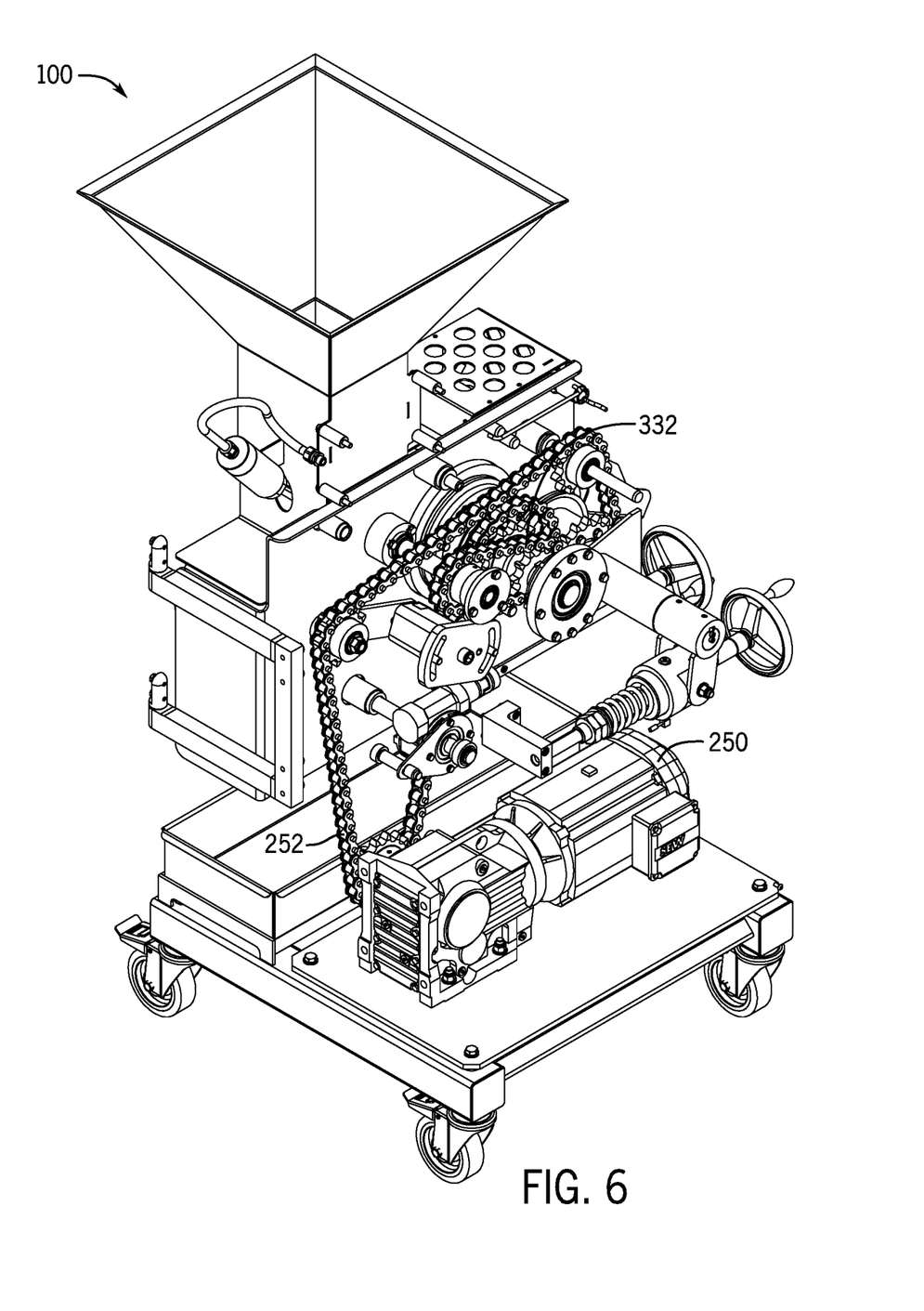
FIG. 6 is a further rear isometric view of the separating machine of FIG. 1 with a housing portion removed according to an example embodiment.

As described in greater detail below, the feeding wheel assembly 320 is driven in the second direction (e.g., the clockwise direction in the view of FIG. 5). As such, in one example, feeding wheel assembly 320 is driven in the same direction as the drum 152. However, the configuration may be modified such that the feeding wheel assembly 320 may be driven in the other direction, including in a common direction or opposite direction of the drum 152 and/or the belt 232.

As the food source material is transported through the separation area 146, the food product with a softer consistency is pressed against the outer surface 154 of the drum 152 and deforms or is otherwise small enough in size to pass through the holes 158 (FIG. 9) within the drum 152, while the waste product with the harder consistency does not pass through the holes 158. In the direction of rotation of the belt 232, the height of the gap between the belt 232 and the drum 152 within the separation area 146 decreases in the downstream direction, thereby providing additional force for the food source material against the drum 152. The belt 232, as supported by the rollers 212, 222, function as a pressing arrangement for pressing the food source material against the drum 152 and the food product through the drum 152. Additionally, the feeding wheel assembly 320 may press the food source material against the drum 152. As a result, the food product is separated from the waste product within the separation area 146.

As the food product is pressed through the holes 158 (FIG. 9), the food product enters the interior of the drum 152. The food product may be rotated within the drum 152 until falling or being pressed out of the open end 162 of the drum 152. The food product is transferred out of the drum 152 and falls into the bin 240. In some examples, a scraper element may also be provided to scrap and urge the food product out of the drum 152.

After passing through the separation area 146, a portion of the waste product continues to be transported on the belt 232. As the belt 232 and associated waste product passes over the top of the roller 222, the waste product falls off the belt 232 (e.g., via gravity) and into the bin 240. Additionally, any portion of the waste product that remains on the drum 152 may be removed with the knife assembly 300 such that these portions of waste product may fall back onto the belt 232 to subsequently be deposited into the bin 240.

Reference is now made to FIGS. 5, 6, 10, 11, 12, and 13, which depict views of the drive arrangement 250 of the separating machine 100 of FIG. 1. In one example, the drive arrangement 250 includes a motor 252, a first drive mechanism (or chain) 254, and one or more drive or guide elements 256, 258, 260, 262, 264. In one example, the drive or guide elements 256, 258, 260, 262, 264 may be in the form of sprockets. The drive arrangement 250 also includes mechanisms for driving the feeding wheel assembly 320, as discussed below.

During operation, the motor 252 generates a rotational force to drive the motor drive element 256 as the output of the motor 252. The motor 252 may be any suitable type of motor, including a combustion, electric, hydraulic, and/or pneumatic motor.

The first drive mechanism 254 is an endless chain that engages with the motor drive element 256 and one or more roller drive elements 258 of one or more of the roller devices 180, 190, 200, 210, 220. In this example, the roller drive element 258 is affixed to the roller shaft 204 of the third roller device 200. As a result, as the motor drive element 256 drives the first drive mechanism 254, the first drive mechanism 254 engages with and drives the roller drive element 258 of the third roller device 200, thereby driving the roller 202 of the third roller device 200. As noted above, the third roller 202 engages to rotate and drive the belt 232. In this example, the first drive mechanism 254 also engages the drum drive element 260 positioned on the periphery of the drum 152. As such, the first drive mechanism 254 additionally drives the drum 152. The first drive mechanism 254 also engages guide elements 262, 264. Additional or alternative drive elements or arrangements may be provided.

Regarding the feeding wheel assembly 320, a drive element 336 is mounted on the shaft 164 that supports the drum 152, and as such, is driven with the shaft 164 and the drum 152 by the first drive mechanism 254. As noted above, the feeding wheel assembly 320 includes the feeding wheel drive element 330 mounted on the feeding wheel shaft 328. The feeding wheel (or second) drive mechanism 332 extends to engage the drive element 336 on the drum shaft 164 and the feeding wheel drive element 330 mounted on the feeding wheel shaft 328. As such, as the motor 252 drives the drum shaft 164 via the first drive mechanism 254, the drum shaft feeding wheel drive 334 drives the feeding wheel drive mechanism 332, which in turn drives the feeding wheel drive element 330 to rotate the feeding wheel implement 322. As a result of this arrangement, the motor 252 may drive the drum 152, belt 232, and feeding wheel assembly 320.

Figure 14:
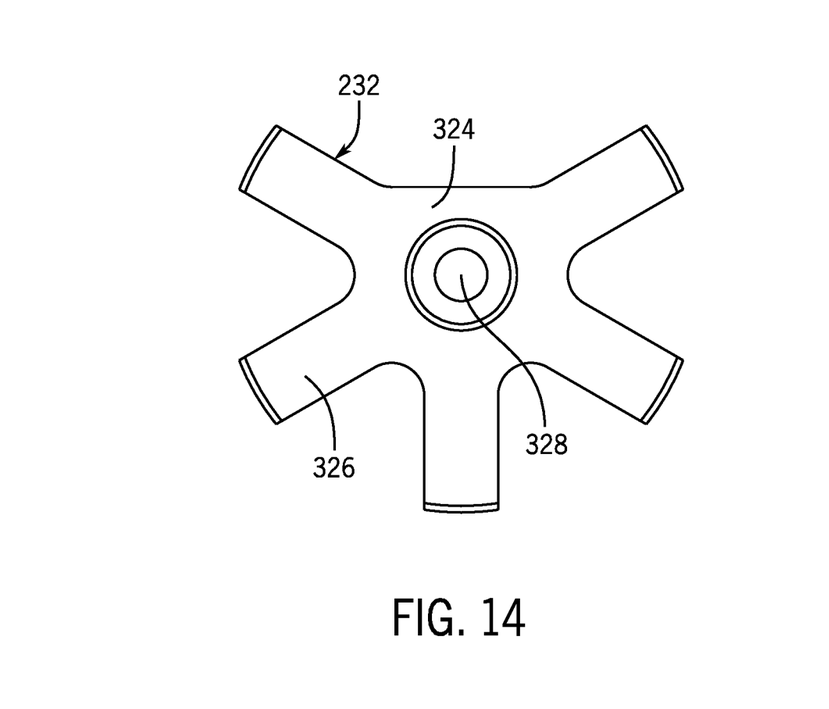
FIG. 14 is a front view of a feeding wheel implement of the feeding wheel assembly of FIG. 12 according to an example embodiment.

Reference is briefly made to FIG. 14, which is an end view of the feeding wheel implement 322. As shown, the feeding wheel implement 322 is formed by the core portion 324 mounted on the feeding wheel shaft 328 and a number of flanges 326 extending from the core portion 324. In the depicted examples, the feeding wheel implement 322 includes five flanges 326, although in other examples, the feeding wheel implement 322 may include other numbers of flanges 326, such as three flanges or additional flanges. As also shown, in one example, the flanges 326 are circumferential asymmetric about the core portion 324. In other words, the spacings between the flanges 326 may vary, e.g., to provide a wider spacing between adjacent flanges 326 and narrower spacing between other adjacent flanges 326. The wider spacings may enable a scooping function for the source food material, while the narrower spacings may enable a pressing function. As such, the feeding wheel implement 322 may provide multiple functions that facilitate processing of the source food material.

In one example, the separating machine 100 further includes a controller 270 to control various aspects of operation. The controller 270 may receive input from an operator interface and/or from one or more sensors 272 associated with the separating machine 100. In response, the controller 270 may activate and/or deactivate the motor 252; and in some examples, the controller 270 may control the speed of the motor 252, and thus, the speed of the belt assembly 230, the drum assembly 150, and the feeding wheel assembly 320. The controller 270 may further generate commands for the tensioning device 280 and knife assembly 300. Other operating parameters may also be modified and/or controlled by the controller 270.

As introduced above, a tensioning device 280 may be associated with the second roller device 190 for applying a tension force to the belt 232. In one example, the second roller device 190 is mounted on the tensioning device 280 such that the tensioning device 280 is configured to selectively reposition the second roller device 190. In particular, as the belt 232 is be passed around the roller 192, the roller 192 may have a variable position in order to set the tensioning force on the belt 232 as set by the tensioning device 280. The tensioning of the belt 232 by the tensioning device 280 operates to apply a tension to the belt 232 to thus urge the food source material on the belt 232 in the separation area 146 to be pressed against the drum 152. The tensioning device 280 may be a manual or mechanical tensioning device or a fluid pressure tensioning device, although other mechanisms may be provided to maintain the tension on the belt 232.

Figure 15:
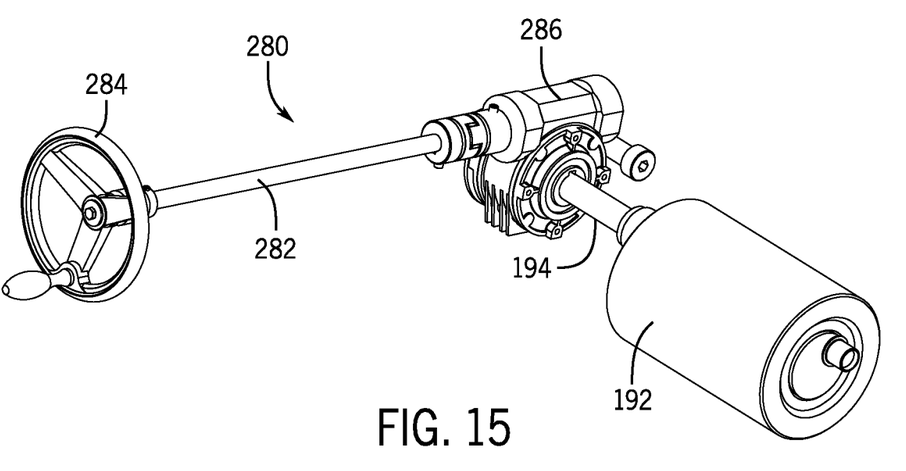
FIG. 15 is an isolated isometric view of a tensioning device that may be implemented in the separating machine of FIG. 1 according to an example embodiment.

The tensioning device 280 is depicted in greater detail in FIG. 15. As shown, the tensioning device 280 includes a tensioner shaft 282; a tensioner adjustment mechanism 284; and a tensioner adjustment gear drive 286. As the adjustment mechanism 284 is adjusted (e.g., by rotating), the gear drive 286 rotates the roller shaft 194. The roller device 190, particularly roller 192, is mounted on roller shaft 194 in a position offset from center such that rotation of the roller shaft 194 about a central longitudinal axis spatially repositions the central longitudinal axis of the roller 192. Due to the eccentric relationship between the roller shaft 194 and the roller 192, the roller 192 increases or decreases the tension of the belt 232 as the roller 194 is spatially repositioned.

The tensioning device 280 operates to maintain a constant tension on the separator belt 232, even when the belt 232 may increase in length over time due to wear and use. As a result, the tensioning device 280 functions to prevent slack in the belt 232 and maintains a constant position of the belt 232 in all conditions, thereby increasing the life of the belt 232.

In some examples, an actuator may be in the form of a hydraulic or pneumatic cylinder coupled to the machine frame 110

Moreover, upon activation by an operator, in one example, the tensioning of the belt 232 is automatic in which the tensioning device 280 is monitored by a sensor and a controller 270 generates a command signal to actuate adjustment of the tensioning device 280.

Although not discussed in detail, the knife assembly 300 is generally positioned at an angular position along the outer surface of the drum 152 that is upstream of the angular position of the separation area along the shortest path between positions in a driven rotational direction of the drum 152. In one example, the knife assembly 300 is formed by a knife assembly actuator mounted to a stationary element, such as the frame 110. In one example, the knife assembly actuator includes a cylinder and a rod element within the cylinder that is fixed at a rod coupling to an actuator rod that operates to extend and retract the rod element and attached actuator rod 306.

An actuator rod may be coupled to a knife assembly arm, which in turn is coupled to a knife coupling supporting a knife shaft. A knife bracket securing a knife element is mounted on the knife shaft. Upon extension or retraction of the actuator rod by the actuator, the knife assembly arm is pivoted about the opposite end, thereby pivoting the knife shaft. In turn, the knife bracket repositions the knife element towards and away from the outer surface of the drum 152. In this example, as the actuator rod is extended, the knife element presses closer to the drum 152, and as the actuator rod is retracted, the knife element moves away from the drum 152.

Although not shown, the knife assembly 300 may be driven by the power unit based on commands from the controller 270, either automatically or based on input from the operator. During operation, the knife element may be pressed against the drum 152 to scrape food material off the outer surface (and/or to press the first food portion through the holes in the drum 152). The controller 270 may modify the amount of pressure of the knife element against the drum based on manual input or automatically based on sensor inputs.

Embodiments discussed herein may provide separating machines that may be operated with improved separation, higher power, and/or at higher operating speed. Further, embodiments, may provide a separating machine with a longer service life for the machine and the pressing elements, and permits more uniform implementation of the separating process. One embodiment further includes a method of separating products of hard and soft consistencies by operating the separating machine as discussed above. It should be understood that the separating machine described above may be used with other machines and/or may have a variety of configurations relative to each with all possibilities intended to be within the spirit and scope of the present disclosure.

As indicated above, one or more controllers may communicate with the various components of the separating machine (as well as machines, devices, and systems outside of the separating machine) to retrieve and/or send information or data as necessary. The controller may include any necessary hardware, software or any combination thereof to achieve the processes, methods, functionalities, operations, etc., of the present disclosure. In one example, the controller may include one or more of software and/or hardware in any proportion. In such an example, the controller may reside on a computer-based platform such as, for example, a server or set of servers. Any such server or servers may be a physical server(s) or a virtual machine(s) executing on another hardware platform or platforms. The nature of the configuration of such server or servers is not critical to the present disclosure. Any server, or for that matter any computer-based system, systems or elements described herein, will be generally characterized by one or more processors and associated processing elements and storage devices communicatively interconnected to one another by one or more busses or other communication mechanism for communicating information or data. In one example, storage within such devices may include a main memory such as, for example, a random access memory (RAM) or other dynamic storage devices, for storing information and instructions to be executed by the processor(s) and for storing temporary variables or other intermediate information during the use of the controller described herein. In one example, the controller may also include a static storage device such as, for example, read only memory (ROM), for storing static information and instructions for the processor(s). In one example, the controller may include a storage device such as, for example, a hard disk or solid state memory, for storing information and instructions. Such storing information and instructions may include, but not be limited to, instructions to compute, which may include, but not be limited to processing and analyzing information of all types. RAMs, ROMs, hard disks, solid state memories, and the like, are all examples of tangible computer readable media, which may be used to store instructions which comprise processes, methods and functionalities of the present disclosure. Execution of such instructions by the control member may cause the various computer-based elements of the control member to perform the processes, methods, functionalities, operations, etc., described herein. In some examples, the controller of the present disclosure may include hard-wired circuitry to be used in place of or in combination with, in any proportion, such computer-readable instructions to implement the disclosure.

The separating machine of the present disclosure may be operated in a wide variety of manners and all of such possibilities are intended to be within the spirit and scope of the present disclosure.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. The use of these terms in association with the separating machine and its components are not intended to limit the separating machine or its components to a single orientation or to limit the separating machine and its components in any manner.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

What is claimed is:

1. A separating machine configured to separate a food source material into a first food portion and a second food portion, the separating machine comprising:
 a frame;
 a separating arrangement supported by the frame and including
  a roller assembly;
  a belt assembly including a belt extending about and configured to be driven by the roller assembly, the belt having an inner surface contacting the roller assembly and an outer surface opposite the inner surface;

a drum assembly including a drum that defines a drum interior, an inner surface facing the drum interior, an outer surface opposite the inner surface, and a plurality of holes extending between the inner and outer surfaces of the drum, wherein the drum assembly is arranged proximate to the belt assembly to define a separation area for the food source material in between;

an inlet assembly configured to receive the food source material; and a feeding wheel assembly positioned proximate to or within the inlet assembly and configured to direct at least a portion of the food source material from the inlet assembly into the separation area, wherein the belt assembly is arranged relative to the belt assembly such that the food source material delivered by the inlet assembly or the feeding wheel assembly into the separation area is pressed by the belt against the outer surface of the drum and the first food portion is pressed through the holes into the drum interior while the second food portion remains outside of the drum interior, thereby separating the first and second food portions.

2. The separating machine of claim 1, wherein the feeding wheel assembly is at least partially within the inlet assembly.

3. The separating machine of claim 1, further comprising a motor arrangement configured to drive the feeding wheel assembly.

4. The separating machine of claim 3, wherein the motor arrangement is further configured to drive the drum assembly.

5. The separating machine of claim 4, wherein the motor arrangement is further configured to drive the feeding wheel assembly and the drum assembly in a common direction.

6. The separating machine of claim 5, wherein the motor arrangement includes a motor, a first drive mechanism extending between the motor arrangement and the drum assembly, and a second drive mechanism extending between the drum assembly and the feeding wheel assembly such that the motor is configured to drive the first drive mechanism to drive the drum assembly, which in turn drives the second drive mechanism to drive the feeding wheel assembly.

7. The separating machine of claim 6, wherein the feeding wheel assembly includes a feeding wheel shaft and a feeding wheel implement mounted on the feeding wheel shaft, wherein the feeding wheel implement includes a core portion and a plurality of flanges extending outwardly from the core portion.

8. The separating machine of claim 7, wherein the plurality of flanges of the feeding wheel implement includes at least three flanges.

9. The separating machine of claim 8, wherein the plurality of flanges of the feeding wheel implement includes at least five flanges.

10. The separating machine of claim 8, wherein the plurality of flanges of the feeding wheel implement are arranged asymmetrically about a circumference of the core portion.

11. The separating machine of claim 1, further comprising a belt tensioning device coupled to the roller assembly and configured to reposition at least a portion of the roller assembly to adjust a tension of the belt.

12. The separating machine of claim 11, wherein the roller assembly includes a plurality of rollers about which the belt extends, and wherein the belt tensioning device is coupled to at least one of the rollers and configured to reposition the at least one of the rollers to increase or decrease the tension of the belt.

13. The separating machine of claim 11, wherein the belt tensioning device includes a tensioning shaft eccentrically coupled to the at least one of the rollers, and a tensioner actuator coupled to pivot the tensioner shaft such that the at least one of the rollers is repositioned.

14. The separating machine of claim 11, wherein the belt tensioning device is configured to maintain the tension in the belt over time.

15. The separating machine of claim 1, further comprising a knife assembly proximate to the outer surface of the drum to remove at least part of the second food portion from the outer surface of the drum.

16. A method for separating a food source material into a first food portion and a second food portion, the method comprising:

receiving the food source material in an inlet assembly;

directing, with a feeding wheel assembly, at least a portion the food source material received by the inlet assembly into a separation area in between a belt of a belt assembly extending about a roller assembly and a drum assembly with a drum having a plurality of holes extending between inner and outer surfaces of the drum; and pressing, with the belt, the food source material against the outer surface of the drum such that the first food portion passes through the plurality of holes and the second food portion remains outside of a drum interior, thereby separating the first and second food portions.

17. The method of claim 16, wherein the directing with the feeding wheel includes driving the feeding wheel assembly with a motor arrangement.

18. The method of claim 17, wherein the driving the feeding wheel assembly includes with the motor arrangement includes driving the feeding wheel assembly in a common direction with the drum assembly.

19. The method of claim 16, wherein the directing with the feeding wheel includes providing a feeding wheel implement with a plurality of flanges arranged asymmetrically about a circumference of a core portion.

20. The method of claim 16, further comprising tensioning the belt with a tensioning device coupled to at least a portion of the roller assembly.

* * * * *